(12) United States Patent
Yan (10) Patent No.: US 11,216,918 B2
(45) Date of Patent: Jan. 4, 2022

(54) METHOD AND DEVICE, AND STORAGE MEDIUM FOR PROCESSING AN IMAGE (71) Applicant: Beijing Dajia Internet Information Technology Co., Ltd., Beijing (CN)

(72) Inventor: Xin Yan, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/036,606

(22) Filed: Sep. 29, 2020

(65) Prior Publication Data

US 2021/0012470 A1 Jan. 14, 2021

(30) Foreign Application Priority Data

Oct. 11, 2019 (CN) .......................... 201910962583.9

(51) Int. Cl.
G06T 5/00 (2006.01)
G06T 7/73 (2017.01)
G06T 3/40 (2006.01)

(52) U.S. Cl.
CPC ............... G06T 5/005 (2013.01); G06T 3/40 (2013.01); G06T 7/73 (2017.01); G06T 2207/20004 (2013.01); G06T 2207/30196 (2013.01)

(58) Field of Classification Search
CPC ..... G06T 17/00; G06T 19/20; G06T 2200/08; G06T 3/0093; G06T 7/12; G06T 7/50; G06T 5/005; G06T 7/73; G06T 3/40; G06T 2207/20004; G06T 2207/30196; G06T 2207/20081; G06T 7/75; G06T 3/0012; G06T 2207/10004
See application file for complete search history.

(56) References Cited

U.S. PATENT DOCUMENTS

| | | | |
|---|---|---|---|
| 2016/0283780 A1* | 9/2016 | Zou | G06K 9/6207 |
| 2018/0114084 A1* | 4/2018 | Meng | G06K 9/3233 |
| 2019/0138791 A1* | 5/2019 | Wang | G06K 9/6256 |
| 2019/0279045 A1* | 9/2019 | Li | G06K 9/3241 |
| 2020/0082635 A1* | 3/2020 | Zhu | G06T 7/248 |
| 2020/0134859 A1* | 4/2020 | Li | G06K 9/4671 |
| 2021/0166396 A1* | 6/2021 | Chen | G06T 3/0006 |

* cited by examiner

Primary Examiner — Nizar N Sivji
(74) Attorney, Agent, or Firm — Burns & Levinson, LLP; Joseph M. Maraia (57) ABSTRACT Disclosed are a method and device for processing an image, and a storage medium. The method includes: determining first position information of key points of first type of an object in the image based on the image and a trained model, where the first position information of each key point of first type indicates where each key point of first type is in the image; determining second position information of key points of second type of the object based on the first position information and a preset algorithm, where the second position information of each second type indicates where each key point of second type is in the image; liquefying the object based on the first position information and the second position information by using a liquefying level corresponding to a portion to be processed of the object.

17 Claims, 5 Drawing Sheets

METHOD AND DEVICE, AND STORAGE MEDIUM FOR PROCESSING AN IMAGE

CROSS REFERENCE TO RELATED APPLICATION

This application is based on and claims priority under 35 U.S.C 119 to Chinese Patent Application No. 201910962583.9, filed on Oct. 11, 2019, in the China National Intellectual Property Administration. The entire disclosure of the above application is incorporated herein by reference.

FIELD

The present disclosure relates to the field of image processing, and in particular to a method, an electronic device and storage medium for processing an image.

BACKGROUND

With the advancement of technology, the functions of smart terminals are becoming more and more abundant. Users can take photos or videos easily by smart terminals. However, in pursuit of beauty, many people have body beautification needs for photos or videos, such as long legs, thin waist, beautiful crotch, enhanced breast, swan neck, etc. Therefore, it is necessary to perform image processing on photos or videos to realize the demands of users.

At present, on the market, the body image is usually beautified based on the key points of the human body. However, because the key points do not cover all parts of the body, the relevant technology cannot completely beautify each part of the body, which leads to a bad effect.

SUMMARY

Embodiments of the present disclosure provide a method and electronic device, and a computer storage medium for processing an image.

According to a first aspect, a method for processing an image is provided. The method includes: determining first position information of key points of first type of an object in the image based on the image and a trained model, where the first position information of each key point of first type indicates where each key point of first type is in the image; determining second position information of key points of second type of the object based on the first position information and a preset algorithm, where the second position information of each second type indicates where each key point of second type is in the image; liquefying the object based on the first position information and the second position information by using a liquefying level corresponding to a portion to be processed of the object.

According to a second aspect, an electronic device is provided. The electronic device includes: a processor and a memory for storing executable instructions of the processor. The processor is configured to execute the instructions to perform: determining first position information of key points of first type of an object in the image based on the image and a trained model, where the first position information of each key point of first type indicates where each key point of first type is in the image; determining second position information of key points of second type of the object based on the first position information and a preset algorithm, where the second position information of each second type indicates where each key point of second type is in the image; liquefying the object based on the first position information and the second position information by using a liquefying level corresponding to a portion to be processed of the object.

According to a third aspect, a computer storage medium is provided. When instructions in the storage medium are executed by a processor of an electronic device, the electronic device is enabled to execute steps of: determining first position information of key points of first type of an object in the image based on the image and a trained model, where the first position information of each key point of first type indicates where each key point of first type is in the image; determining second position information of key points of second type of the object based on the first position information and a preset algorithm, where the second position information of each second type indicates where each key point of second type is in the image; liquefying the object based on the first position information and the second position information by using a liquefying level corresponding to a portion to be processed of the object.

It should be understood that the above general descriptions and the following detailed descriptions are only exemplary and explanatory rather than limit the present disclosure.

BRIEF DESCRIPTION OF THE DRAWINGS

The drawings herein are incorporated into the description and constitute a part of the description, show embodiments conforming to the disclosure, and are used to explain principles of the disclosure together with the description, and do not constitute an improper limitation of the disclosure. In the attached drawings.

DETAILED DESCRIPTION OF THE EMBODIMENTS

In order to enable those ordinarily skilled in the art to better understand the technical solutions of the present disclosure, the technical solutions in the embodiments of the present disclosure will be described clearly and completely with reference to the accompanying drawings.

It should be noted that the terms "first" and "second" in the description and claims of the present disclosure and the above-mentioned drawings are used to distinguish similar objects, and are not necessarily used to describe a specific sequence or order. It should be understood that the data used in this way may be interchanged under appropriate circumstances so that the embodiments of the present disclosure described herein may be implemented in an order other than those illustrated or described herein. The implementation manners described in the following exemplary embodiments do not represent all implementation manners consistent with the present disclosure. Rather, they are merely examples of devices and methods consistent with some aspects of the present disclosure as detailed in the appended claims.

The technical solutions provided by the embodiments of the present disclosure are described below with reference to the drawings.

At present, when users use smart devices to take photos or video, they will use the body beautify function for, such as, legs, waist, crotch, breasts, neck and other parts. However, the current beautify functions are usually performed based on key points of the human body, but the key points only cover some of the main parts of the human body. For the parts that are not covered, beautify effects are poor, and presentation effects are not good.

In view of this, the present disclosure provides a method for processing an image. In this method, for an object, the quantity of key points of the object can be extended to get more key points to facilitate the processing of the image. In this regard, the object key points initially obtained is referred as key points of first type, and the key points obtained by extending is referred as key points of second type. In this method, position information of key points of second type corresponding to a portion that needs an extended processing is obtained based on position information of key points of first type corresponding to this portion and a preset algorithm, and a processed image is obtained by liquefaction based on the position information of the position information of the key points of first type and second type. In the embodiments of the disclosure, the portion that needs an extended processing is referred as a detail portion. In this way, the human body is beautified based on the position information of key points and the position information of the key points of second type, to at least allow all the parts of the body to be beautified, thereby presenting a better beautify effect.

It should be noted that the methods provided in the embodiments of the present disclosure are not only applicable to human bodies but also to objects such as animals and plants.

For ease of understanding, the technical solutions provided by the present disclosure will be further described below with reference to the accompanying drawings.

Figure 1:
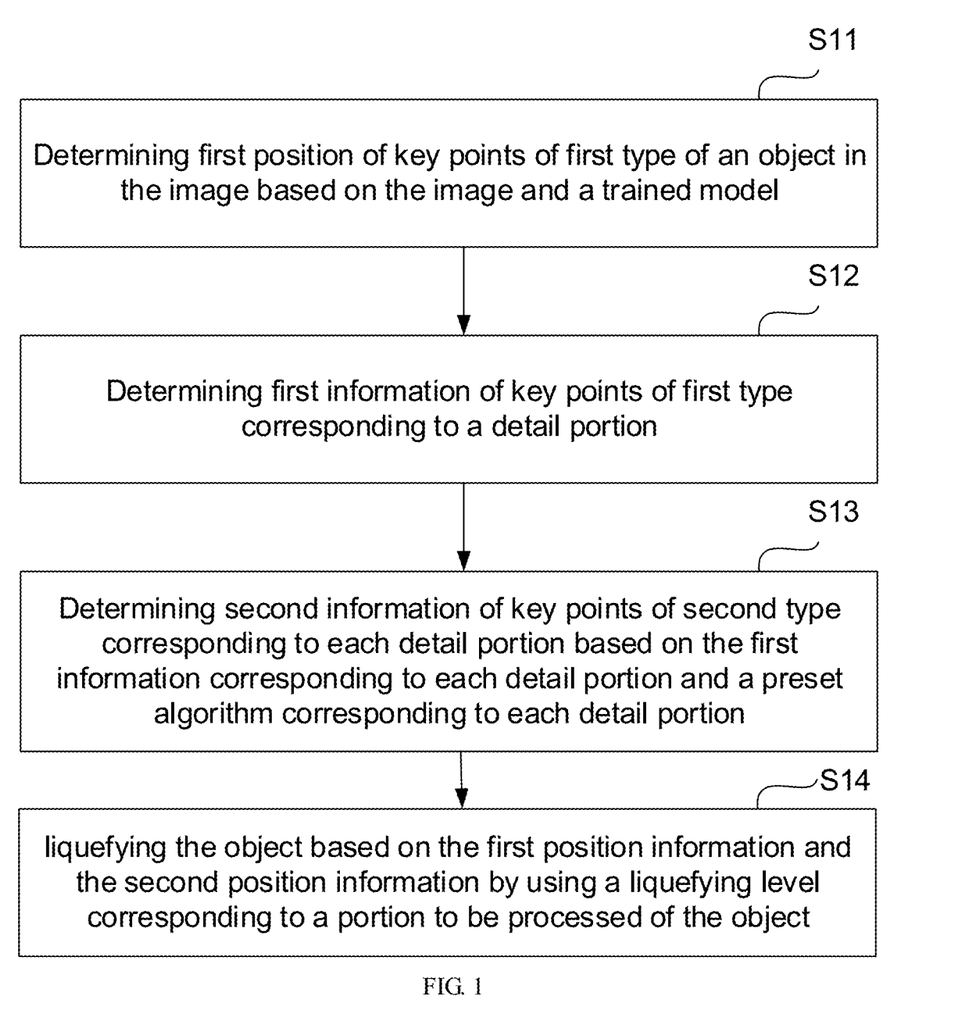
FIG. 1 is a schematic flowchart showing a method for processing an image according to some embodiments.

FIG. 1 is a schematic flowchart showing a method for processing an image according to some embodiments. The method includes the following steps.

S11: determining first position information of key points of first type of an object in the image based on the image and a trained model, where the first information of each key point of first type indicates where each key point of first type is in the image.

Figure 2:
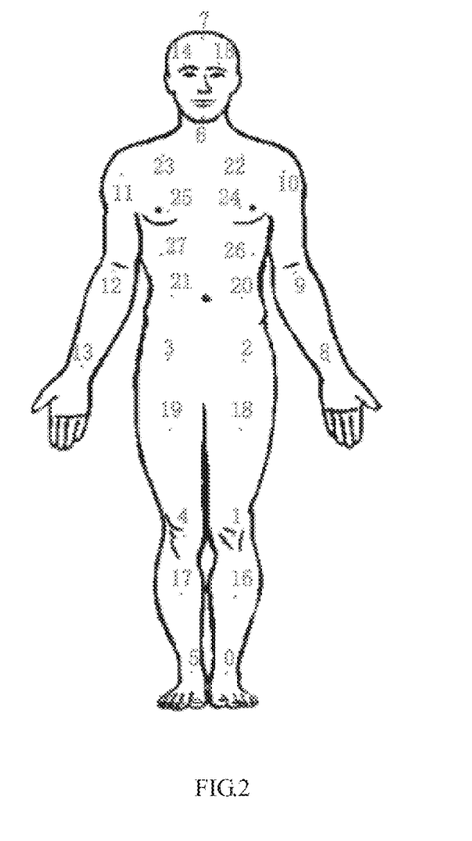
FIG. 2 is a schematic diagram showing the distribution map of key points of first type according to some embodiments.

FIG. 2 is a schematic diagram of a map of object key points, i.e., a map of key points of first type. The points labeled with the numbers (0-27) in FIG. 2 are the key points of first type. Generally, a total of 28 stable and suitable key points of first type are obtained through a trained model. Of course, different numbers of key points of first type may also be determined based on actual requirements, which is not limited in the present disclosure.

In some embodiments, the first position information of the key points of first type of an object may be obtained by inputting the image into the trained model.

It should be noted that the image in the embodiments of the present disclosure may be a picture or a video. In case that the image is a video, the video is divided into frames, and every frame of image obtained is input into the trained model, and thus the first position information of the key points of first type in each frame of image is obtained.

S12: determining first position information of key points of first type corresponding to each portion in the object.

In some embodiments, the key points of first type only cover some main parts of the human body. For a detailed part, the key points of first type may be not sufficient for beautification, thus the effects are not good. Therefore, for a detailed part that needs beautification, this part is determined as a detail portion, and key points of first type that the part contains within a preset range are determined. For example, if the portion between key points 3 and 21 in FIG. 2 is to be beautified but no key points of first type exists in that range, then this range may be used as a detail portion. Key points (e.g., 3 and 21) that the part contains within a preset range are found out, and the position information of the key point 3 and the key point 21 are determined.

S13: determining second position information of key points of second type corresponding to each detail portion, based on the first position information of key points of first type corresponding to the detail portion and a preset algorithm corresponding to each detail portion.

In some embodiments, after the position information of the key point 3 and the key point 21 are determined, a key point of second type corresponding to the detail portion may be determined based on the position information of the key point 3 and the key point 21. For example, the midpoint of the key point 3 and the key point 21 are taken as a key point of second type corresponding to the detail portion. In some embodiments, the position information of the key point 3 and the key point 21 are added and averaged to obtain the position information of the key point of second type.

In some embodiments, in addition to using the midpoint of two key points of first type as a key point of second type, other algorithms may also be used to determine the key point of second type. For example, a line between two key points of first type is extended by a preset length and stops, where the line stops is used as the position of the key point of second type, or, the key points of first type are shifted to get the key points of second type, etc.

These algorithms are preset, and corresponding algorithms are used for different detail portions. It should be noted that the algorithm for determining the position information of the key points of second type may be the same or different according to different detail portions, and the present disclosure does not limit this.

Figure 3:
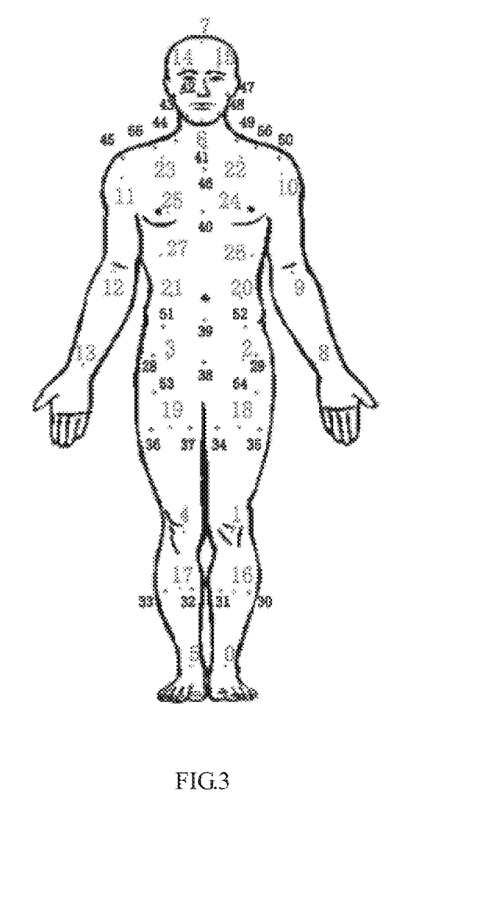
FIG. 3 is a schematic diagram showing the distribution map of key points of first type and key points of second type according to some embodiments.

As shown in FIG. 3, in some embodiments, the key points of second type are obtained by extending according to the key points of first type. Generally there are 29 key points of second type (the points labeled with the numbers 28-56 in FIG. 3 are key points of second type). Of course, different numbers of key points may also be determined based on actual requirements, which is not limited in the present disclosure.

S14: liquefying the object based on the first position information and the second position information by using a liquefying level corresponding to a portion to be processed of the object.

The liquefying level of every portion is preset and different. In this way, the human body is beautified based on the position information of the key points of first type and the key points of second type, so that the beautification effect is enabled to cover all the parts of the body, thereby presenting a better beautification effect.

In some embodiments, the liquefying process may include following operations A1-A3.

A1: determining position information of the portion to be processed, where the position information of the portion to be processed comprises first position information corresponding to the portion to be processed, or second position information corresponding to the portion to be processed.

A2: determining the liquefying level corresponding to the portion to be processed, wherein the liquefying level is preset.

A3: liquefying pixels corresponding to the position information of the portion to be processed based on the liquefying level and a preset liquefying type.

In this way, for any part that needs to be beautified, the part may be beautified based on the position information of all key points corresponding to the part and the liquefying level.

In some embodiments, three liquefying types are provided, which are respectively Forward, BloatWrinkle, and Restoration. The three types will be discussed in detail as follows.

Forward: this operation is to select one key point as the circle center, form a circle with a preset radius, and extrude, push and pull the circle towards another key point. For example, if the waist image is extruded from the left side of the waist towards the right side of the waist, the left side will be drawn inward, to get a thin waist.

BloatWrinkle: this operation is to select one key point as the circle center, and tighten the image inward with a preset radius. For example, a key point on the head is selected as the circle center to form a circle with the preset radius. The circle contains the head, and the pixels in the circle shrink towards the center of the circle, to get a small head.

In some embodiments, the closer the pixels are to the center of the circle, the stronger the liquefaction effect will be.

Restoration: this operation is to select one key point as the circle center, form a circle with a preset radius, and restore the pixels in the circle to be in the state when no liquefaction is performed.

In some embodiments, at least one of the above three liquefying types needs to be used for beautification operation of any part.

In some embodiments, in order to increase the processing speed during liquefying, a resolution of the image is reduced, and then the liquefying is performed on the resolution reduced image. In some embodiments, the steps are as follows: acquiring a resolution decreased image by decreasing a resolution of the image based on a preset factor; liquefying the object in the resolution decreased image; acquiring a processed image by restoring the resolution of the resolution decreased image after liquefaction.

In some embodiment, the resolution is usually reduced by 8 times. Of course, the resolution may also be reduced by other factors based on specific cases, which is not limited in the present disclosure.

In some embodiments, some parts are associated with other parts. That is, when one part is beautified, this one part will be affected by the associated parts. Based on this, determining a liquefying level may include the following operations B1-B6.

B1: determining, in the object, an associating portion of the portion to be processed and position information of the associating portion.

B2: determining, in the object, an influencing portion of the portion to be processed and the associating portion, determining position information of a first part of the influencing portion corresponding to the portion to be processed, and position information of a second part of the influencing portion corresponding to the associating portion.

B3: determining a first distance between the first part and the portion to be processed based on the position information of the portion to be processed and the position information of the first part.

B4: determining a second distance between the second part and the associating portion based on the position information of the associating portion and the position information of the second part.

B5: acquiring a weight of the liquefying level corresponding to the portion to be processed by normalizing the first distance and the second distance.

B6: determining the liquefying level corresponding to the portion to be processed by weighting a preset liquefying level corresponding to the portion to be processed based on the weight.

In some embodiments, the method will be described by beautifying the neck as an example.

If beautification of the left neck is desired, the right neck that is associated with the left neck also needs to be beautified. In this case, the left neck is the portion to be processed, the right neck is the associating portion, the face is the influencing portion, and two side of the face are the first part and second part of the influencing portion. Key points of the two types corresponding to the left and right necks are obtained respectively, and key points of the two types corresponding to both sides of the human face are obtained. A distance from the key point corresponding to the left face to the key point corresponding to the left neck is determined as the first distance, and a distance from the key point corresponding to the right face to the key point corresponding to the right neck is determined as the second distance.

If there are a plurality of key points on both sides of the human face, key points closest to that on the neck are selected as key points on both sides of the human face. After obtaining the two distances on both sides, the two distances are normalized, and the obtained treatment parameters are used for the liquefying level for the liquefying process.

For example, if liquefying levels on both sides of the neck are initially set as the same, the first distance is 6 and the second distance is 10, then after normalizing, the treatment parameter for the left neck is 0.6 and the treatment parameter for the right neck is 1. Thus the liquefying level of the left neck is 0.6 times of the liquefying level of the right neck.

In some embodiments, when a user turns his head left, as the left neck coefficient decreases, the liquefying level gradually decreases, and the liquefying level of the right neck increases accordingly, and vice versa. In this way, for parts that require a finer liquefaction effect, the method may make the liquefaction effect better and improve user experience.

In some embodiments, in case that the image is included in a video, when the user performs beautification on the video, the position information of the same processing point collected in every frame may be different due to the user's moving. In order to make the processed video more smooth, in some embodiments, the principle of low-pass filtering to smooth the video is used, as shown in the following operations C1-C2.

C1: weighing a sum of position information of a processing point in the image and position information of a same processing point in a previous image, where the previous image and the image are successive frames in a video, based on a preset weight, wherein the processing point is a key point of first type or a key point of second type.

C2: determining a weighted result as position information of the processing point in the image.

For example, if the position information of the same processing point in two consecutive frames is (30, 60) and (40, 80) respectively, then the two pieces of position information are added to obtain (70, 140). The obtained results are weighted with the preset weight. If the preset weights are both 0.5, the obtained position information is (35, 70). Then (35, 70) is taken as the position information of the processing point in the later frame in the two consecutive frames.

In some embodiments, the two preset weights of the position information may be the same or different. For example, the preset weight of the position information of the first coordinate is 0.4, and the preset weight of the position information of the second coordinate is 0.6, and then the obtained position information is (28, 84).

In some embodiments, if the image has 3 frames in total, processing results based on first and second frames are taken as the position information in the second frame, and processing results based on original second and third frames are taken as the position information in the third frame. As such, the position information in every frame is obtained.

Of course, processing results based on the first and second frames may also be taken as the position information in the second frame, and processing results based on the processed second frame and the original third frame may be taken as the position information in the third frame. As such, the position information in every frame is also obtained, which is not limited.

In this way, by processing the position information in every frame, the beautified video display may be more stable.

In some embodiments, movement of the user may cause loss of the processing points, e.g., a processing point is included in the previous frame of image, but is not included in the next frame of image, and thus there will be a problem that the beautification sharply stops due to the loss of the processing point in the next frame of the image, resulting in bad user experience. In order to solve this problem, in some embodiments, the following operations are provided. For a sudden loss of a processing point, fault-tolerant processing is conducted on the video, as shown in operations D1-D2.

D1: selecting a preset quantity of successive frames following the image, in a case that a processing point exists in a previous image of the image and does not exist in the image, during the processing point being liquefied based on a preset liquefying level.

D2: liquefying images of the preset quantity of successive frames based on gradually diminished liquefying levels.

For example, if processing points suddenly disappear during the beautification process, 10 image frames following such image frame are selected, the current liquefying level is reduced by a preset decreasing coefficient, to allow that at the $10^{th}$ frame, the liquefying level is reduced to 0. In this way, by reducing the liquefying level gradually, the beautification effect may be smoothly transitioned to 0 without an image mutation, thereby improving the user experience.

It should be noted that, the processing point in this application includes at least one of the key points of first type and the key points of second type.

In one embodiment, if the lost processing points reappear in the selected image frames, the beautification operation is performed based on the processing points.

Figure 4:
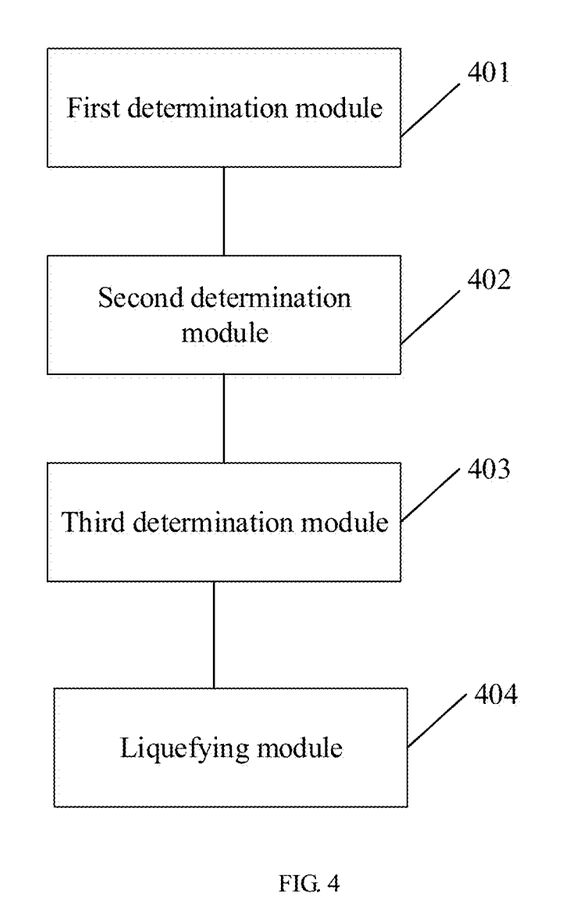
FIG. 4 is a block diagram showing a device for processing an image according to some embodiments.

Based on the same inventive concept, the present disclosure further provides a device for processing an image. As shown in FIG. 4, the device includes:

a first determination module 401 configured to determine first position information of key points of first type of an object in the image based on the image and a trained model, wherein the first position information of each key point of first type indicates where each key point of first type is in the image;

a second determination module 402 configured to determine first position information of key points of first type corresponding to each detail portion;

a third determination module 403 configured to determine second position information of key points of second type corresponding to each detail portion, based on the first position information of key points of first type corresponding to each detail portion and a preset algorithm corresponding to each detail portion; and a liquefying module 404 configured to liquefy the object based on the first position information and the second position information by using a liquefying level corresponding to a portion to be processed of the object.

Further, the liquefying module 404 includes:

a position information determination unit configured to determine position information of the portion to be processed, wherein the position information of the portion to be processed comprises first position information corresponding to the portion to be processed, or second position information corresponding to the portion to be processed;

a liquefying level determination unit configured to determine the liquefying level corresponding to the portion to be processed, wherein the liquefying level is preset; and a liquefaction unit configured to liquefy pixels corresponding to the position information of the portion to be processed based on the liquefying level and a preset liquefying type.

Further, if the part is associated with other parts, the liquefying level determination unit includes:

an associated part determination subunit configured to determine in the object, an associating portion of the portion to be processed and position information of the associating portion;

an influencing portion determination subunit configured to determine an influencing portion of the portion to be processed and the associating portion, and position information of a first part of the influencing portion corresponding to the portion to be processed, and position information of a second part of the influencing portion corresponding to the associating portion;

a first distance determination subunit configured to determine a first distance between the first part and the portion to be processed based on the position information of the portion to be processed and the position information of the first part;

a second distance determination subunit configured to determine second distance between the second part and the associating portion based on the position information of the associating portion and the position information of the second part;

a normalizing subunit configured to acquire a weight of the liquefying level corresponding to the portion to be processed by normalizing the first distance and the second distance; and a liquefying level determination subunit configured to determine the liquefying level corresponding to the portion to be processed by weighting a preset liquefying level corresponding to the portion to be processed based on the weight.

Further, in case that the image is a video, the device further includes:

a weighting module configured to weight a sum of position information of a processing point in the image and position information of a same processing point in a previous image, wherein the previous image and the image are successive frames in a video, based on a preset weight, wherein the processing point is a key point of first type or a key point of second type; and a position information determination module configured to determine a weighted result as position information of the processing point in the image.

Further, in case that the image is a video, the device further includes:

an image frame determination module configured to, select a preset quantity of successive frames following the image, in a case that a processing point exists in a previous image of the image and does not exist in the image, during the processing point being liquefied based on a preset liquefying level; and a decreasing module configured to liquefy images of the preset quantity of successive frames based on gradually diminished liquefying levels.

Further, the liquefying module 404 includes:

a reduction module configured to acquire a resolution decreased image by decreasing a resolution of the image based on a preset factor, and liquefy the object in the resolution decreased image; and a restoration module configured to acquire a processed image by restoring the resolution of the resolution decreased image after liquefaction.

Figure 5:
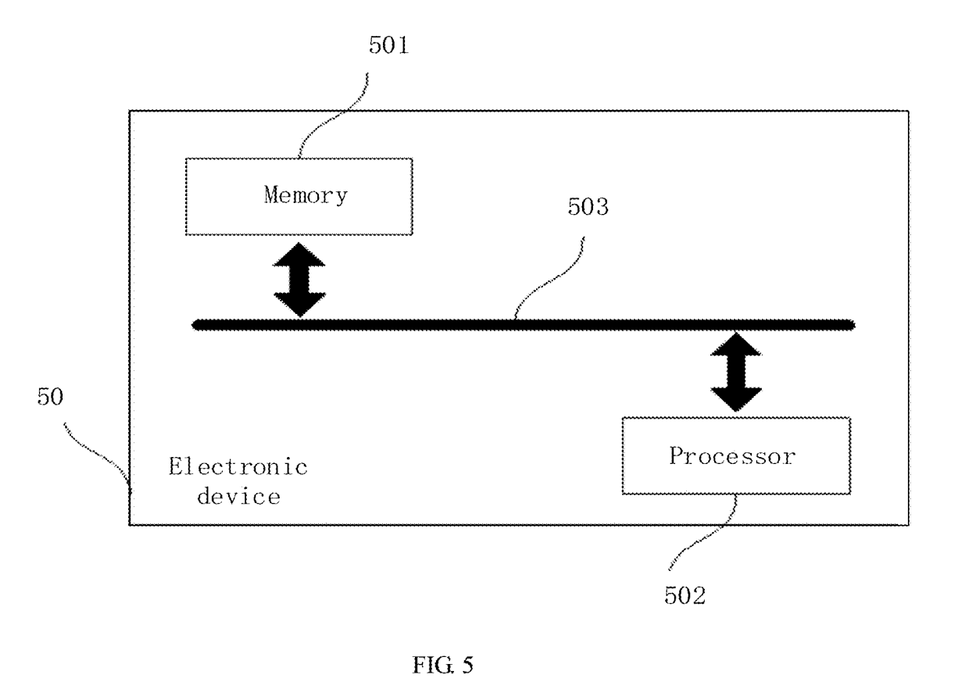
FIG. 5 is a block diagram showing another device according to some embodiments.

As shown in FIG. 5, based on the same technical concept, an embodiment of the present disclosure further provides an electronic device 50, which may include a memory 501 and a processor 502.

The memory 501 is configured to store a computer program executed by the processor 502. The memory 501 may mainly include a program storage area and a data storage area. The program storage area may store an operating system, an application program required by at least one function, and the like, and the data storage area may store data created based on the use of the information recommendation device. The processor 502 may be a central processing unit (CPU), or a digital processing unit and the like. The specific connection medium between the memory 501 and the processor 502 is not limited in the embodiment of the present disclosure. In the embodiment of the present disclosure in FIG. 5, the memory 501 and the processor 502 are connected via a bus 503, and the bus 503 is indicated by a thick line in FIG. 5. The connection modes of other components are only for the purpose of schematic illustrations and are not intended to be limiting. The bus 503 may be divided into an address bus, a data bus, a control bus, and so on. For ease of illustration, only one thick line is used in FIG. 5, but this does not mean that there is only one bus or one type of bus.

The memory 501 may be a volatile memory, such as a random-access memory (RAM), the memory 501 may also be a non-volatile memory, such as a read-only memory, a flash memory, a hard disk drive (HDD) or a solid-state drive (SSD), or the memory 501 may be any other medium that can be used to carry or store desired program codes in the form of instructions or data structures and can be accessed by a computer, to which the present disclosure is not limited, however. The memory 501 may be a combination of the above-mentioned memories.

The processor 502 is configured to execute the method executed by the device in the embodiment shown in FIG. 1 when invoking the computer program stored in the memory 501.

In some possible implementation manners, various aspects of the method provided in the present disclosure may further be implemented in the form of a program product, which includes program codes. When the program product runs on a computer device, the program codes enable the computer device to execute the steps in the method according to various exemplary embodiments of the present disclosure described above in the description. For example, the computer device may execute the method executed by the device in the embodiments shown in FIGS. 2 to 3.

The program product may use any combination of one or more readable media. The readable medium may be a readable signal medium or a readable storage medium. The readable storage medium may be, e.g., but not limited to, an electrical, magnetic, optical, electromagnetic, infrared, or semiconductor system, device, or means, or any combination of the above. More specific examples (non-exhaustive list) of the readable storage medium include an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

Although the embodiments of the present disclosure have been described, those skilled in the art may make additional changes and modifications to these embodiments as long as they learn the basic creative concept. Therefore, the appended claims are intended to be interpreted as including the preferred embodiments and all the variations and modifications falling within the scope of the present disclosure. Those skilled in the art will easily think of other embodiments of the present disclosure after considering the description and practicing the disclosure herein. The present disclosure is intended to cover any variations, uses, or adaptive changes of the present disclosure, and these variations, uses, or adaptive changes follow the general principles of the present disclosure and include common knowledge or conventional technical means in the technical field not disclosed in the present disclosure. The description and the embodiments are only regarded as exemplary, and the true scope and spirits of the disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for processing an image, comprising:
   determining first position information of key points of first type of an object in the image based on the image and a trained model, wherein the first position information of each key point of first type indicates where each key point of first type is in the image;
   determining second position information of key points of second type of the object based on the first position information and a preset algorithm, wherein the second position information of each second type indicates where each key point of second type is in the image; and
   liquefying the object based on the first position information and the second position information by using a liquefying level corresponding to a portion to be processed of the object;
   wherein said that determining second position information comprises:

determining each detail portion of the object;
determining first position information of key points of first type corresponding to each detail portion; and
determining second position information of key points of second type corresponding to each detail portion, based on the first position information of key points of first type corresponding to each detail portion and a preset algorithm corresponding to each detail portion.

2. The method according to claim 1, wherein said that liquefying the object comprises:
determining position information of the portion to be processed, wherein the position information of the portion to be processed comprises first position information corresponding to the portion to be processed, or second position information corresponding to the portion to be processed;
determining the liquefying level corresponding to the portion to be processed, wherein the liquefying level is preset; and
liquefying pixels corresponding to the position information of the portion to be processed based on the liquefying level and a preset liquefying type.

3. The method according to claim 2, wherein said that determining the liquefying level comprises:
determining, in the object, an associating portion of the portion to be processed and position information of the associating portion;
determining, in the object, an influencing portion of the portion to be processed and the associating portion;
determining position information of a first part of the influencing portion corresponding to the portion to be processed, and position information of a second part of the influencing portion corresponding to the associating portion;
determining a first distance between the first part and the portion to be processed based on the position information of the portion to be processed and the position information of the first part;
determining a second distance between the second part and the associating portion based on the position information of the associating portion and the position information of the second part;
acquiring a weight of the liquefying level corresponding to the portion to be processed by normalizing the first distance and the second distance;
determining the liquefying level corresponding to the portion to be processed by weighting a preset liquefying level corresponding to the portion to be processed based on the weight.

4. The method according to claim 1, wherein the method further comprises:
weighing a sum of position information of a processing point in the image and position information of a same processing point in a previous image, wherein the previous image and the image are successive frames in a video, based on a preset weight, wherein the processing point is a key point of first type or a key point of second type; and
determining a weighted result as position information of the processing point in the image.

5. The method according to claim 1, wherein the method further comprises:
selecting a preset quantity of successive frames following the image, in a case that a processing point exists in a previous image of the image and does not exist in the image, during the processing point being liquefied based on a preset liquefying level; and
liquefying images of the preset quantity of successive frames based on gradually diminished liquefying levels.

6. The method according to claim 1, wherein said that liquefying the object comprises:
acquiring a resolution decreased image by decreasing a resolution of the image based on a preset factor;
liquefying the object in the resolution decreased image;
acquiring a processed image by restoring the resolution of the resolution decreased image after liquefaction.

7. An electronic device, comprising:
a processor; and
a memory for storing executable instructions of the processor,
wherein the processor is configured to execute the instructions to perform:
determining first position information of key points of first type of an object in the image based on the image and a trained model, wherein the first position information of each key point of first type indicates where each key point of first type is in the image;
determining second position information of key points of second type of the object based on the first position information and a preset algorithm, wherein the second position information of each second type indicates where each key point of second type is in the image; and
liquefying the object based on the first position information and the second position information by using a liquefying level corresponding to a portion to be processed of the object;
wherein said that determining second position information comprises:
determining each detail portion of the object;
determining first position information of key points of first type corresponding to each detail portion; and
determining second position information of key points of second type corresponding to each detail portion, based on the first position information of key points of first type corresponding to each detail portion and a preset algorithm corresponding to each detail portion.

8. The electronic device according to claim 7, wherein said that liquefying the object comprises:
determining position information of the portion to be processed, wherein the position information of the portion to be processed comprises first position information corresponding to the portion to be processed, or second position information corresponding to the portion to be processed;
determining the liquefying level corresponding to the portion to be processed, wherein the liquefying level is preset; and
liquefying pixels corresponding to the position information of the portion to be processed based on the liquefying level and a preset liquefying type.

9. The electronic device according to claim 8, wherein said that determining a liquefying level comprises:
determining, in the object, an associating portion of the portion to be processed and position information of the associating portion;
determining, in the object, an influencing portion of the portion to be processed and the associating portion;

determining position information of a first part of the influencing portion corresponding to the portion to be processed, and position information of a second part of the influencing portion corresponding to the associating portion;

determining a first distance between the first part and the portion to be processed based on the position information of the portion to be processed and the position information of the first part;

determining a second distance between the second part and the associating portion based on the position information of the associating portion and the position information of the second part;

acquiring a weight of the liquefying level corresponding to the portion to be processed by normalizing the first distance and the second distance;

determining the liquefying level corresponding to the portion to be processed by weighting a preset liquefying level corresponding to the portion to be processed based on the weight.

10. The electronic device according to claim 7, wherein the processor is further configured to execute the instructions to perform:

weighing a sum of position information of a processing point in the image and position information of a same processing point in a previous image, wherein the previous image and the image are successive frames in a video, based on a preset weight, wherein the processing point is a key point of first type or a key point of second type; and determining a weighted result as position information of the processing point in the image.

11. The electronic device according to claim 7, wherein the processor is further configured to execute the instructions to perform:

selecting a preset quantity of successive frames following the image, in a case that a processing point exists in a previous image of the image and does not exist in the image, during the processing point being liquefied based on a preset liquefying level; and liquefying images of the preset quantity of successive frames based on gradually diminished liquefying levels.

12. The electronic device according to claim 7, wherein said that liquefying the object comprises:

acquiring a resolution decreased image by decreasing a resolution of the image based on a preset factor;

liquefying the object in the resolution decreased image;

acquiring a processed image by restoring the resolution of the resolution decreased image after liquefaction.

13. A non-transitory computer storage medium, wherein, when instructions in the storage medium are executed by a processor of an electronic device, the electronic device is enabled to execute steps of:

determining first position information of key points of first type of an object in the image based on the image and a trained model, wherein the first position information of each key point of first type indicates where each key point of first type is in the image;

determining second position information of key points of second type of the object based on the first position information and a preset algorithm, wherein the second position information of each second type indicates where each key point of second type is in the image; and liquefying the object based on the first position information and the second position information by using a liquefying level corresponding to a portion to be processed of the object;

wherein said that determining second position information comprises:

determining each detail portion of the object;

determining first position information of key points of first type corresponding to each detail portion; and determining second position information of key points of second type corresponding to each detail portion, based on the first position information of key points of first type corresponding to each detail portion and a preset algorithm corresponding to each detail portion.

14. The computer storage medium according to claim 13, wherein said that liquefying the object comprises:

determining position information of the portion to be processed, wherein the position information of the portion to be processed comprises first position information corresponding to the portion to be processed, or second position information corresponding to the portion to be processed;

determining the liquefying level corresponding to the portion to be processed, wherein the liquefying level is preset; and liquefying pixels corresponding to the position information of the portion to be processed based on the liquefying level and a preset liquefying type.

15. The computer storage medium according to claim 14, wherein said that determining a liquefying level comprises:

determining, in the object, an associating portion of the portion to be processed and position information of the associating portion;

determining, in the object, an influencing portion of the portion to be processed and the associating portion;

determining position information of a first part of the influencing portion corresponding to the portion to be processed, and position information of a second part of the influencing portion corresponding to the associating portion;

determining a first distance between the first part and the portion to be processed based on the position information of the portion to be processed and the position information of the first part;

determining a second distance between the second part and the associating portion based on the position information of the associating portion and the position information of the second part;

acquiring a weight of the liquefying level corresponding to the portion to be processed by normalizing the first distance and the second distance;

determining the liquefying level corresponding to the portion to be processed by weighting a preset liquefying level corresponding to the portion to be processed based on the weight.

16. The computer storage medium according to claim 13, wherein when instructions in the storage medium are further executed by the processor of the electronic device, the electronic device is enabled to execute steps of:

weighing a sum of position information of a processing point in the image and position information of a same processing point in a previous image, wherein the previous image and the image are successive frames in a video, based on a preset weight, wherein the processing point is a key point of first type or a key point of second type; and determining a weighted result as position information of the processing point in the image.

17. The computer storage medium according to claim 13, wherein when instructions in the storage medium are further executed by the processor of the electronic device, the electronic device is enabled to execute steps of:

selecting a preset quantity of successive frames following the image, in a case that a processing point exists in a previous image of the image and does not exist in the image, during the processing point being liquefied based on a preset liquefying level; and liquefying images of the preset quantity of successive frames based on gradually diminished liquefying levels.

\* \* \* \* \*